United States Patent Office 3,297,666
Patented Jan. 10, 1967

3,297,666
VINYLIDENE CHLORIDE ALKYL ACRYLATE/ACRYLONITRILE TERPOLYMERS AND PROCESS FOR PREPARING THE SAME
William G. MacPherson, Bay City, Mich., assignor to The Dow Chemical Company, Midland, Mich., a corporation of Delaware
No Drawing. Filed Apr. 1, 1963, Ser. No. 269,738
9 Claims. (Cl. 260—80.5)

This invention relates to new terpolymers composed predominantly of vinylidene chloride and to flexible webs coated therewith. The invention is further concerned with an improved process for preparing the terpolymers.

Vinylidene chloride polymers are known to be useful in forming barrier coatings on certain flexible substrata, such as regenerated cellulose. Certain of those polymers composed of at least 80 percent vinylidene chloride with the remainder of acrylonitrile have found widest utility because of their solubility in cheap, readily available, organic solvents, such as acetone, methyl ethyl ketone, and the like. Such polymers, however, have not been free of problems, such as heat sealability and adhesion to plastic film substrata. Also, the vinylidene chloride-acrylonitrile copolymers have frequently had insoluble fractions when polymerization was carried to high conversion. Other similar problems have been manifested with those prior vinylidene chloride polymers.

With the above views in mind, it would be desirable to have and accordingly it is the principal object of this invention to provide improved vinylidene chloride polymers.

It is a further object to prepare such resins having improved, organic solubility.

It is a still further object to prepare such resins having improved heat seal and adhesion properties.

It is yet another object to provide improved, flexible webs coated with the resins.

Another object is to provide an improved process for preparing the resins.

The above and related objects are achieved by means of the terpolymers consisting of from 70 to 85 percent by weight vinylidene chloride, from 14 to 29 percent by weight of an alkyl ester of an acid selected from the group consisting of acrylic acid and methacrylic acid wherein the alkyl group contains from about 12 to about 18 carbon atoms, and from 1 to 3 percent by weight of acrylonitrile. The invention further comprehends a flexible web coated with a continuous, adherent heat-sealable coating of the above class of terpolymers. The objects are still further realized by means of an improved process as will be described.

The monomeric entity from which the herein claimed terpolymers are prepared is composed of the above-identified monomers in the defined proportions. When the terpolymers contain less than about 70 percent by weight vinylidene chloride, the barrier properties of the coatings are noticeably reduced. When the terpolymers are composed of more than about 85 percent by weight vinylidene chloride, the beneficial effects of the other comonomers are lessened.

The acrylic ester to be utilized in the new terpolymers is of acrylic acid or methacrylic acid with the alkyl ester group containing from about 12 to about 18 carbon atoms. Acrylic esters wherein the alkyl group is composed of mixtures of the 12 to 18 carbon atom groups may also be used to secure the objectives of the invention. Esters of alkyl groups less than 12 carbon atoms do not provide the benefits and particularly the solubility characteristics of the esters within the claimed range. Alkyl esters wherein the alkyl group is greater than 18 carbon atoms are not readily available.

The acrylonitrile is required for heat sealability. If no acryonitrile is used, acceptable heat seals are not obtained with the coatings. When more than about 3 percent by weight acrylonitrile is put into the polymer, that increases the heterogeneity of the polymer unless great care with complicated polymerization techniques is employed.

When the indicated monomeric materials are employed in the indicated proportions, the stated objectives of the invention are realized. Deviation outside of the chemical identity of the monomer or the proportions will adversely affect the resultant coatings.

The terpolymers may be prepared by any known polymerization procedure with aqueous emulsion polymerization being most advantageous when barrier coating resins are to be prepared. Although conventional emulsion polymerization technology may be utilized to prepare acceptable terpolymers, it is preferred to use a modified continuous technique. In that preferred procedure, an aqueous phase containing the acrylonitrile monomer, a water-soluble free-radical polymerization catalyst, and an emulsifier for the monomers in water is prepared and heated to elevated temperature known to induce polymerization while agitated. Acrylate ester and vinylidene chloride monomers are added continuously during polymerization until polymerization is substantially complete. It is also possible to add all of the vinylidene chloride and acrylate ester monomers to the already prepared aqueous phase. It is also possible to add the acrylonitrile to the polymerizing charge near the completion of polymerization. Regardless of the technique employed, the resulting latex may be utilized as such or the resin may be isolated by coagulation, filtration, washing, and drying.

The functional ingredients used in emulsion polymerization are well known. Thus, the catalysts should be water-soluble, free-radical compounds which will initiate polymerization of olefinically unsaturated monomers at slightly elevated temperatures. Typical catalysts include hydrogen peroxide and potassium persulfate. Redox catalysis systems may also be employed. Typical of such systems are hydrogen peroxide and iron and potassium persulfate and sodium bisulfite.

The emulsifiers useful in emulsion polymerization are also well known in the art. Those of the anionic classification of wetting agents have found most usefulness in the preparation of latexes. Representative of such emulsifiers is the dihexyl ester of sodium sulfosuccinic acid and the sodium sulfate derivative of 2-ethyl-1-hexanol. Others will be known. It is convenient in the emulsion polymerization of the present monomers to dissolve part of the emulsifier in the aqueous phase and part in the monomer phase prior to preparing the initial emulsion.

The percent solids depends upon the amount of monomer used in the polymerization recipe and on the percent conversion of monomer to polymer. In the present instance, the preparation of the terpolymers is independent of the percent solids so that the solids are primarily of significance from practical viewpoints.

Temperatures utilized in conventional emulsion polymerizations are also well known. Usually those temperatures range from about 25 to about 65° C., although slightly higher or lower temperatures may be employed.

For preparing useful coating compositions, the dried resin is dissolved in known organic solvents. To obtain rapid dissolution, it is frequently advantageous to agitate the solvent while the resin is slowly added thereto and to maintain the solvent at a slightly elevated temperature during that addition. The concentration of resin in the organic solvent to be employed depends on the coating thickness desired and on the viscosity that the particular coating technique to be used will tolerate. Optimum concentration in any given instance can be determined by simple preliminary experiments. Usually, concentrations of from about 5 to about 20 percent by weight will be adequate. Typical solvents include mixtures of tetrahydrofuran and toluene, methyl ethyl ketone and toluene, and acetone. Other solvents will be known by reference to the literature or by routine experimentation.

The coating compositions may contain conventional additives, such as dyes, stabilizers, fillers, and the like, used in the traditional amounts.

The substrata which may benefit by the coatings of this invention include any flexible web which is insoluble to the solvent system chosen. Exemplary of such substrata are regenerated cellulose, cellulose esters and ethers, and polyolefins. It is sometimes desirable to have an anchor coat on the substrata prior to the coating with the terpolymers of the present invention. Such anchor coats usually provide superior adhesion of the polymeric coating to the substratum.

The advantages and benefits derivable from the present invention will be illustrated by the following example wherein all parts and percentages are by weight.

*Example*

Into a jacketed polymerization vessel equipped with a coaxial agitator is added 90 parts of water, 1 part acrylonitrile, 0.45 part potassium persulfate, 0.54 part of the dihexyl ester of sodium sulfosuccinic acid, and 0.3 part Tergitol 08. Ninety parts of mixed monomers composed of 21 percent octyldecyl methacrylate and 79 percent vinylidene chloride were prepared. To the mixed monomers there was added 1.16 pounds of the dihexyl ester of sodium sulfosuccinic acid and 0.43 part of Tergitol 08. Five parts of these mixed monomers with emulsifiers were then added to the aqueous phase and 0.018 part sodium bisulfite added. The temperature utilized was 45° C. As soon as the polymerization started, the balance of the monomers was fed to the reactor at a rate of 5 percent per hour. After all of the monomers had been added, the reaction was continued for another 3 hours or to a constant pressure. The reactor was then vented, cooled at 30° C., and evacuated for one hour. The latex was coagulated, washed, and dried. The resulting resin was finely granulated and was soluble at room temperature in a solvent system consisting of 65 percent tetrahydrofuran and 35 percent toluene. The solution was coated on regenerated cellulose to give a dry thickness of about 0.001 inch. The coating was found to have adequate adhesion to the substratum, could be heat sealed using a conventional hot bar sealer, and exhibited superior barrier properties to moisture and air.

When the above procedures were repeated except that the acrylonitrile was omitted, the resulting coatings could not be heat sealed.

The beneficial results noted for the terpolymer of this invention above can also be realized with any of the terpolymers composed of from 70 to 85 percent vinylidene chloride, from 14 to 29 percent of any alkyl ester of acrylic or methacrylic acid wherein the alkyl group contains from 12 to 18 carbon atoms, and from 1 to 3 percent acrylonitrile.

What is claimed is:
1. A terpolymer suitable as a heat sealable coating for flexible webs consisting of from 70 to 85 percent by weight vinylidene chloride, from 14 to 29 percent by weight of an alkyl ester of an acid selected from the group consisting of acrylic acid and methacrylic acid wherein the alkyl ester contains from about 12 to 18 carbon atoms and from 1 to 3 percent by weight acrylonitrile.

2. A terpolymer suitable as a heat sealable coating for flexible webs consisting of 79 percent vinylidene chloride, 20 percent octyldecyl methacrylate, and 1 percent by weight acrylonitrile.

3. A flexible web coated with a continuous, adherent, heat-sealable coating of a terpolymer consisting of from 70 to 85 percent vinylidene chloride, from 14 to 29 percent by weight of an alkyl ester of an acid selected from the group consisting of acrylic acid and methacrylic acid wherein the alkyl ester contains from about 12 to 18 carbon atoms and 1 to 3 percent by weight acrylonitrile.

4. The coated flexible web of claim 3 wherein the flexible web is regenerated cellulose.

5. The flexible web of claim 3 wherein said coating is of a terpolymer of 79 percent vinylidene chloride, 20 percent octyldecyl methacrylate, and 1 percent acrylonitrile.

6. A process for preparing terpolymers consisting of from 70 to 85 percent by weight vinylidene chloride, from 14 to 29 percent by weight of an alkyl ester of an acid selected from the group consisting of acrylic acid and methacrylic acid wherein the alkyl ester contains from about 12 to 18 carbon atoms and 1 to 3 percent by weight acrylonitrile, comprising the preparation of an aqueous phase consisting essentially of a water-soluble, free-radical polymerization catalyst and an anionic emulsifier, adding to said aqueous phase mixed monomers of the vinylidene chloride and alkyl ester, incorporating the acrylonitrile, and maintaining the mixture under agitation at an elevated temperature known to induce polymerization until polymerization is substantially complete.

7. The process of claim 6 wherein the acrylonitrile monomer is added to the aqueous phase prior to the addition of the vinylidene chloride and alkyl ester monomers.

8. The process of claim 6 wherein the acrylonitrile is added subsequent to the commencement of polymerization of the vinylidene chloride and alkyl ester monomers.

9. The process of claim 6 wherein an initial increment of about 10 percent by weight of the vinylidene chloride and alkyl ester monomers is incorporated into the aqueous phase and the remaining 95 percent of said monomers added continuously thereto.

References Cited by the Examiner
UNITED STATES PATENTS

| | | | |
|---|---|---|---|
| 3,034,929 | 5/1962 | Koch | 117—145 |
| 3,041,208 | 6/1962 | Hay et al. | 260—80.5 X |
| 3,144,425 | 8/1964 | Koch et al. | 117—145 X |
| 3,175,926 | 3/1965 | Hahn et al. | 260—80.5 X |

JOSEPH L. SCHOFER, *Primary Examiner.*

W. HOOVER, *Assistant Examiner.*